(12) United States Patent
Yu et al.

(10) Patent No.: US 9,615,395 B2
(45) Date of Patent: Apr. 4, 2017

(54) SYSTEMS, METHODS, AND DEVICES FOR CONTROLLING TRANSPORT OF RATELESSLY CODED MESSAGES

(71) Applicant: INTEL CORPORATION, Santa Clara, CA (US)

(72) Inventors: Yifan Yu, Haidian District (CN); Xu Zhang, Beijing (CN); Guangjie Li, Beijing (CN); Xiang Li, Beijing (CN)

(73) Assignee: INTEL CORPORATION, Santa Clara, CA (US)

( * ) Notice: Subject to any disclaimer, the term of this patent is extended or adjusted under 35 U.S.C. 154(b) by 306 days.

(21) Appl. No.: 14/316,929

(22) Filed: Jun. 27, 2014

(65) Prior Publication Data

US 2015/0146615 A1    May 28, 2015

Related U.S. Application Data

(60) Provisional application No. 61/909,938, filed on Nov. 27, 2013.

(51) Int. Cl.
*H04W 28/02* (2009.01)
*H04W 76/04* (2009.01)
(Continued)

(52) U.S. Cl.
CPC ........ *H04W 76/048* (2013.01); *H04B 7/2621* (2013.01); *H04L 1/1825* (2013.01);
(Continued)

(58) Field of Classification Search
CPC ... H04W 80/04; H04W 84/045; H04W 88/16; H04W 88/08; H04W 88/02; H04W 92/02; H04W 40/02; H04W 40/20
(Continued)

(56) References Cited

U.S. PATENT DOCUMENTS

| 6,553,540 B1 * | 4/2003 | Schramm | H04L 27/2602 |
| | | | 714/790 |
| 2005/0085182 A1 * | 4/2005 | Chuberre | H04B 1/1615 |
| | | | 455/3.01 |

(Continued)

OTHER PUBLICATIONS

International Search Report and Written Opinion for PCT/US2014/061780 filed Oct. 22, 2014, and mailed from the International Search Authority on Jan. 26, 2015, 10 pgs.

*Primary Examiner* — Jae Y Lee
*Assistant Examiner* — Jean F Voltaire
(74) *Attorney, Agent, or Firm* — Stoel Rives LLP

(57) ABSTRACT

Systems, methods, and devices for controlling transport of ratelessly coded messages are disclosed herein. User equipment (UE) may be configured to receive a data object using a plurality of radios having distinct radio protocols. The data object may divided into a plurality of segments, and the segments may be encoded with a random linear network code before transmission. The random linear network code may permit the UE to reassemble each segment from any large enough set of encoded packets. The UE may use delivery control messages with very low overhead to control the flow of packets for each radio. The UE may control the number of packets received for each segment without specifying which particular packets should be sent. The transmitters may transmit the packets with very little overhead, and encoding information for the packets may be included in the packets in a compact form.

24 Claims, 8 Drawing Sheets

(51) Int. Cl.
*H04L 5/00* (2006.01)
*H04L 5/14* (2006.01)
*H04W 72/04* (2009.01)
*H04W 52/02* (2009.01)
*H04L 1/18* (2006.01)
*H04L 29/08* (2006.01)
*H04W 40/30* (2009.01)
*H04L 12/825* (2013.01)
*H04W 16/14* (2009.01)
*H04B 7/26* (2006.01)
*H04L 27/26* (2006.01)
*H04W 72/02* (2009.01)
*H04W 88/06* (2009.01)
*H04W 88/10* (2009.01)
*H04W 36/00* (2009.01)

(52) U.S. Cl.
CPC .......... *H04L 5/0007* (2013.01); *H04L 5/0032* (2013.01); *H04L 5/0051* (2013.01); *H04L 5/0073* (2013.01); *H04L 5/14* (2013.01); *H04L 27/2607* (2013.01); *H04L 47/25* (2013.01); *H04L 69/324* (2013.01); *H04W 16/14* (2013.01); *H04W 28/0205* (2013.01); *H04W 40/30* (2013.01); *H04W 52/0216* (2013.01); *H04W 52/0254* (2013.01); *H04W 72/02* (2013.01); *H04W 72/042* (2013.01); *H04W 72/048* (2013.01); *H04W 72/0453* (2013.01); *H04W 76/046* (2013.01); *H04W 36/0083* (2013.01); *H04W 88/06* (2013.01); *H04W 88/10* (2013.01); *Y02B 60/50* (2013.01)

(58) Field of Classification Search
USPC ......................................... 370/328
See application file for complete search history.

(56) References Cited

U.S. PATENT DOCUMENTS

| | | |
|---|---|---|
| 2008/0189429 A1* | 8/2008 | DaCosta ........... H04L 29/06027 709/231 |
| 2010/0095014 A1 | 4/2010 | Zuckerman et al. |
| 2010/0124228 A1* | 5/2010 | Tinnakornsrisuphap H04L 63/08 370/392 |
| 2011/0238987 A1 | 9/2011 | Kherani et al. |
| 2012/0155531 A1 | 6/2012 | Yi et al. |
| 2012/0213307 A1 | 8/2012 | Perry et al. |

* cited by examiner

SYSTEMS, METHODS, AND DEVICES FOR CONTROLLING TRANSPORT OF RATELESSLY CODED MESSAGES

RELATED APPLICATIONS

This application claims priority to and the benefit of U.S. Provisional Patent Application No. 61/909,938, filed Nov. 27, 2013, which is hereby incorporated by reference herein in its entirety.

TECHNICAL FIELD

The present disclosure relates to a protocol for controlling transport of ratelessly coded messages and to a protocol for encoding messages.

DETAILED DESCRIPTION OF PREFERRED EMBODIMENTS

Figure 1:
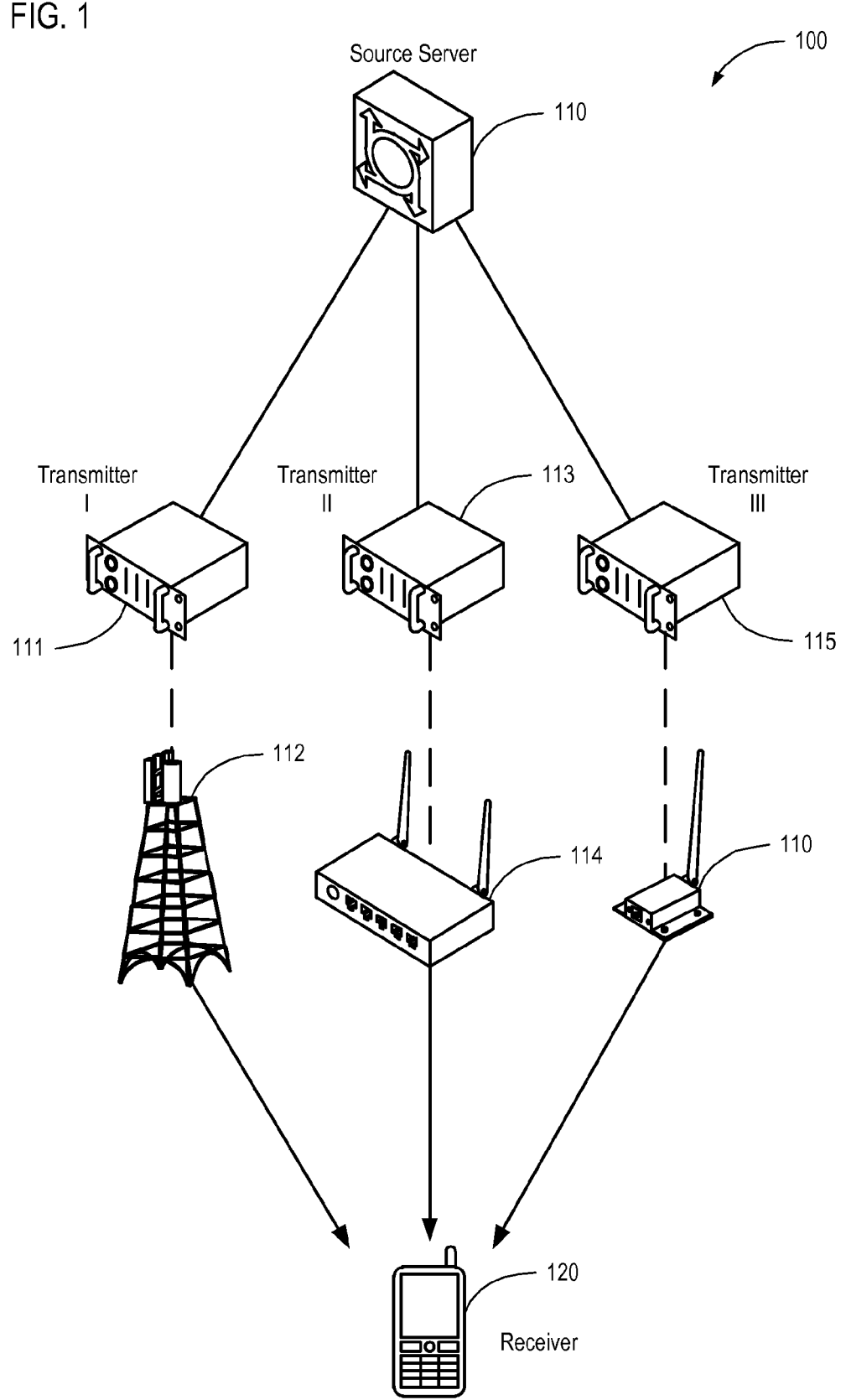
FIG. 1 is a schematic diagram of a system for transmitting a data object to a UE using a plurality of radios.

Wireless mobile communication technology uses various standards and protocols to transmit data between a base station and a wireless communication device. Wireless communication system standards and protocols can include, for example, the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard, which is commonly known to industry groups as Wi-Fi. In 3GPP radio access networks (RANs) in LTE systems, a base station may include Evolved Universal Terrestrial Radio Access Network (E-UTRAN) Node Bs (also commonly denoted as evolved Node Bs, enhanced Node Bs, eNodeBs, or eNBs) and/or Radio Network Controllers (RNCs) in an E-UTRAN, which communicate with a wireless communication device, known as user equipment (UE). An evolved packet core (EPC) may communicatively couple the E-UTRAN to an external network, such as the Internet. LTE networks include radio access technology and core radio network architecture that provide high data rate, low latency, packet optimization, and improved system capacity and coverage. In LTE networks, an E-UTRAN may include a plurality of eNodeBs and may communicate with a plurality of UEs.

UEs may be communicatively coupled to the Internet via a plurality of radios, and each radio may be using a distinct radio protocol. For example, a UE may be simultaneously connected to the Internet via the E-UTRAN according to the LTE protocol and via a Wi-Fi base station according to the 802.11 protocol. In alternate embodiments, the UE may be coupled by one or more wired connections. The UE may be able to stream data from a source server using the plurality of radios, which may allow for faster downloading than if the radios were used separately. Traditionally, the UE would have to coordinate which packets were received by each radio to prevent duplicate packets being received. The UE may be required to use significant processing and communication overhead to track which packets were received and to delegate not yet received packets among the radios.

A linear network code may be used to encode packets prior to transmission to the UE. The linear network code may be a random linear network code, a fountain code, and/or the like. A random linear network code may allow a segment of data to be decoded from any large enough set of received packets without the particular packets received and/or lost being important. Encoding the packets prior to transmission to each radio of the UE may obviate the need to coordinate which packets are transmitted. As long as each transmitter is sending distinct packets, the UE only needs to ensure that it received enough packets to decode the data segment. Thus, the UE may save processing and/or communication resources if the transmitters use random linear network codes. Initial seeds used by each transmitter for the random linear network code may be determined randomly to attempt to avoid the transmission of identical packets.

The UE may use a lightweight protocol for controlling transmission of packets by the transmitters. The lightweight protocol may include only three types of messages from transmission from the UE to the transmitters: transmission control messages, semi-termination messages (e.g., segment completion messages), and termination messages (e.g., connection termination messages). The UE may transmit transmission control messages to each transmitter to instruct the transmitters as to what should be transmitted. For example, a transmission control message may indicate the maximum number of packets that should be sent, from which segment the packets should be derived, how the packets should be encoded, a sequence number identifying the order in which the transmission control messages were transmitted, and/or the like. The sequence number can be generated with the status of the decoder in the receiver. By specifying in advance the maximum number of packets, the UE may avoid having large numbers of packets en route when it decides that no more packets are needed and may thus reduce bandwidth usage. The transmitters may be able to send packets from more than one segment at the same time. Accordingly, the UE may send a plurality of transmission control messages that specify a plurality of segments from which packets should be derived. Different transmitters may send packets derived from different segments and/or derived from the same segments.

Once the UE has received sufficient packets to decode a segment, it may send a semi-termination message indicating that no additional packets derived from that segment should be transmitted. For example, a transmitter may not have reached the maximum number of packets specified in the transmission control message when the UE is able to decode the segment, so the UE may send the semi-termination message to prevent the transmitter from using additional resources by continuing to transmit packets until the maximum number is reached. The transmitter may continue transmitting packets for any other segments when the semi-termination message is received. If the UE is unable to decode the segment but all transmitters have reached the maximum number of packets to be transmitted, the UE may send one or more additional transmission control messages to the transmitter(s). Based on the sequence numbers of the transmission control messages, the transmitter(s) may determine the most recent transmission control message and thereby resolve conflicts between multiple received messages. Accordingly, the UE may also be able to send transmission control messages even before the transmitters have transmitted the maximum number previously specified.

When the UE is able to decode all segments and/or no longer wishes to receive packets from a transmitter, the UE may transmit a termination message. The transmitter may cease transmission of all packets from any of the segments in response to the termination message. Because the UE sends a limited number of feedback messages and each feedback message includes few parameters, the processing and communication overhead of the UE may be reduced. For example, the UE does not need to send an acknowledgement for every packet received, or even any packet received, so the overhead will be much lower than in schemes where acknowledgements are required. In some embodiments, only two to three response packets per transmitter will be needed for each segment decoded.

The transmitters may also require little overhead for their transmissions to the UE. At least one transmitter may initially transmit an indication of the size of a data object to be transmitted (e.g., a data file, a streaming file, etc.). The transmitters may be configured to break the data object up into a plurality of segments and each segment into a plurality of source blocks. The source blocks may equal the size of the payload for the packets in some embodiments. The segment and/or source block size may be predetermined, so the UE may be able to compute the number of segments, the size of a last segment, the size of a last source block, and/or the like from the size of the data object. Accordingly, little other information may need to be sent for the UE to begin determining which segments to request.

Each packet sent by the transmitters may include a segment index indicative of a segment from which the packet was derived. The UE may use the segment index to determine which segment each packet should be associated with for decoding. In an embodiment, the segment index may be only two bytes. Each packet may also include an encoding indicator indicative of the parameters used with the random linear network code to encode the packet payload from the segment. For example, the encoding indicator may be used to determine an initial seed for a pseudorandom number generator. The pseudorandom number generator may generate one or more pseudorandom numbers for the payload of each packet, and one or more encoding coefficients for each payload may be derived from the corresponding pseudorandom number(s). The encoding indicators may be randomly selected by the UE and/or by each transmitter so that the transmitters are unlikely to have identical encoding coefficients for their transmitted packets. The packets may not require further overhead for successful transmission and decoding of packets.

In an embodiment, the pseudorandom number generator may compute pseudorandom numbers according to the equation:

$$x_{k+1} = 4x_k(1-x_k), x_k \in (0,1) \quad (1)$$

where $x_{k+1}$ is a next pseudorandom number and $x_k$ is a previous pseudorandom number. The initial seed for the pseudorandom number generator may be computed from the encoding indicator according to the equation:

$$x_0 = \begin{cases} (\alpha - M + 1)/(65536 - M), \alpha \in [M, 65534] \\ .9999999, \alpha = 65535 \end{cases} \quad (2)$$

where $M \in [16,256]$, $x_0$ is the initial seed, and $\alpha$ is the encoding indicator. M may be the number of source block per segment. Given the data delivery is from multiple transmitters to a single receiver, the transmitters may be required to use the same value for M. The encoding coefficient for the ith source block in the jth encoded packet may be derived from a corresponding pseudorandom number according to the equation:

$$\beta_i^j = \lfloor 256 x_i \rfloor, i \in [1,256] \quad (3)$$

where $\beta_i^j$ is the encoding coefficient for the ith source block in the jth encoded packet and $x_i$ is the ith pseudorandom number. If the encoding indicator is between 0 and M−1, inclusive, the corresponding source block may be sent without any encoding. Accordingly, if the encoding indicator is known to both the transmitter and the UE, the encoding coefficient(s) for the payload of each packet can be derived without any further communication. In an embodiment, each packet for a segment other than the last segment may include 256 encoding coefficients, and the number of encoding coefficients for the last segment may be adjusted based on its size.

The UE may decode a segment by resolving a decoding matrix. Each element of the decoding matrix may be calculated based on the pseudorandom number generator. In an embodiment, for segments other than the last segment, the decoding matrix may be of size 256×256. For the last segment, each row vector may include the same number of elements as the number of source blocks in the last segment. The recovered segment with the lowest index should be delivered to the destination operating system, persistent storage device, application, and/or the like.

FIG. 1 is a schematic diagram of a system 100 for transmitting a data object to a UE 120 using a plurality of transmitters 111, 113, 115. The UE 120 may be wirelessly communicatively coupled to a plurality of transmitters 111, 113, 115 by a plurality of antennas 112, 114, 116. A source server 110 may contain a data object that has been requested by the UE 120. The source server 110 may provide the data object to the plurality of transmitters 111, 113, 115 for delivery to the UE 120 using a plurality of distinct radio protocols. The source server 110 may comprise the transmitters 111, 113, 115 in some embodiments, or the transmitters 111, 113, 115 may be distinct from the source server 110. For example, the transmitters 111, 113, 115 may include routers belonging to internet service providers, such as the EPC.

The transmitters 111, 113, 115 may deliver packets encoded by a random linear network code to the UE 120 using a protocol with low overhead. In an embodiment, the source server 110 may deliver the data object and/or portions of the data object to the transmitters 111, 113, 115. The transmitters 111, 113, 115 may control encoding of segments for delivery to the UE 120. The transmitters 111, 113, 115 may determine which and how many packets to transmit based on the feedback received from the UE 120. Alternatively, or in addition, the source server 110 may encode the packets and may determine which packets to transmit based on the feedback from the UE 120.

Figure 2:
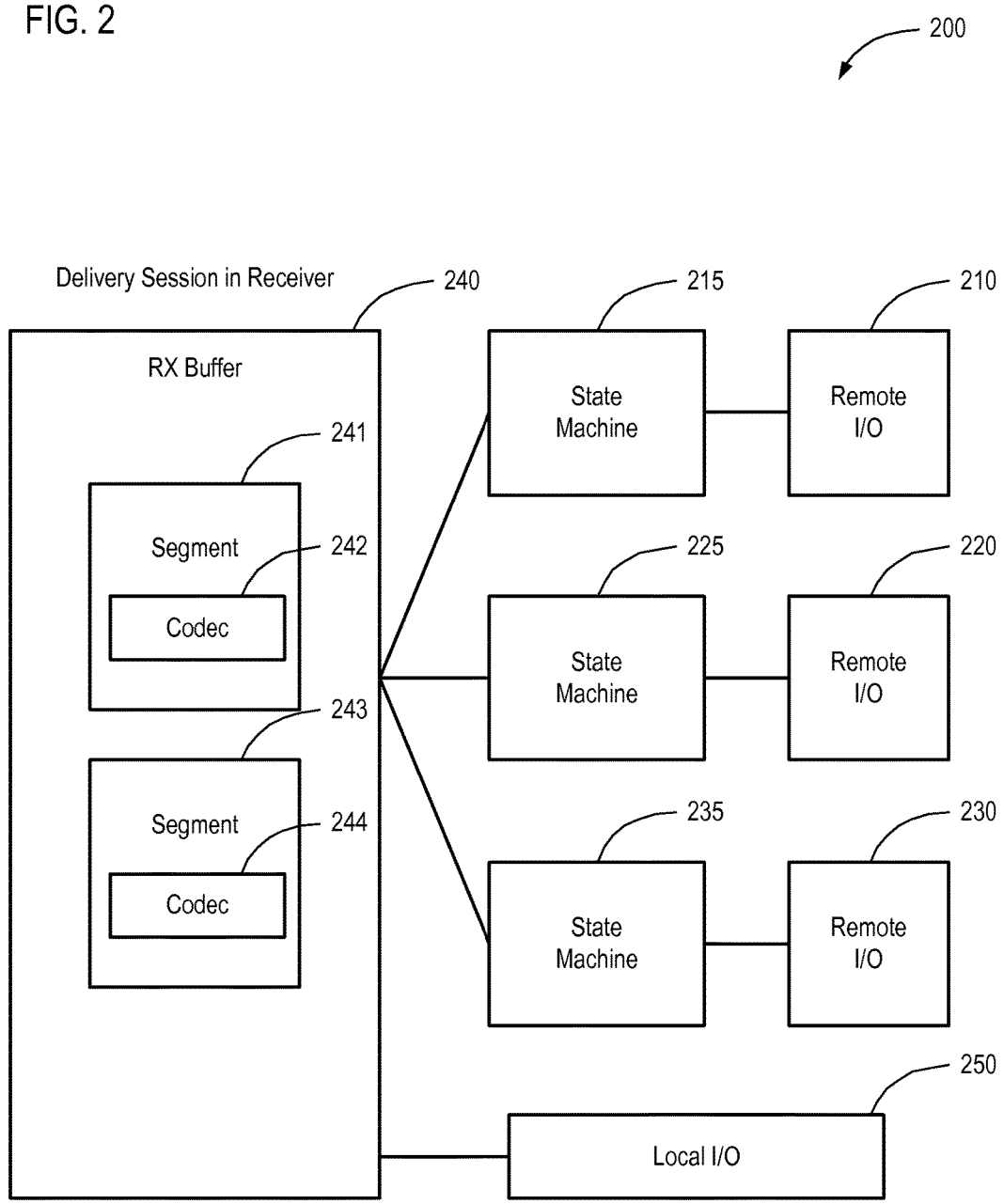
FIG. 2 is a schematic diagram of a UE configured to receive a data object using a plurality of radios.

FIG. 2 is a schematic diagram of a UE 200 configured to receive a data object using a plurality of radios 210, 220, 230. Each radio 210, 220, 230 may be configured to receive packets from a respective transmitter (not shown) using a radio protocol distinct from the radio protocols used by the other radios 210, 220, 230. Each radio 210, 220, 230 may be communicatively coupled to a state machine 215, 225, 235. The state machines 215, 225, 235 may communicate received packets to a receive buffer 240. The state machines 215, 225, 235 may also determine which feedback control packets to deliver to the transmitters. The state machines 215, 225, 235 may communicate with the receive buffer 240 to determine how many packets have been deliver and how many more packets will be needed in order to decode each segment. Based on the information provided by the receive buffer 240, the state machines 215, 225, 235 may determine whether to send transmission control messages, semi-termination messages, and/or termination messages to the transmitters.

The receive buffer 240 may include buffers 241, 243 for each segment being received from the transmitters and/or for already decoded segments. The receive buffer 240 may monitor how many packets have been received and how many more will be needed to decode the segment. The receive buffer 240 may also include codecs 242, 244 for decoding each segment. The receive buffer 240 may determine the codecs based on the encoding indicators received from the transmitters. When the receive buffer 240 has received enough packets for a particular segment, it may decode the segment. For example, the receive buffer 240 may attempt to decode the segment when a predetermined number of packets have been received. If decoding fails, the receive buffer 240 may wait for and/or request additional packets and try again. Alternatively, or in addition, the receive buffer 240 may perform whatever decoding is possible each time a new packet is received.

The receive buffer 240 may decode the segment by resolving a matrix for the segment. Each element in the decoding matrix may be calculated by the receive buffer based on the pseudorandom numbers generated from the encoding indicators. Once a segment has been decoded or the entire data object has been decoded, the receive buffer 240 may use a local communication interface 250 to provide the segment and/or data object to an operating system, persistent storage device, application, and/or. In an embodiment, the receive buffer 240 may deliver a recovered segment with a lowest index during decoding.

Figure 3:
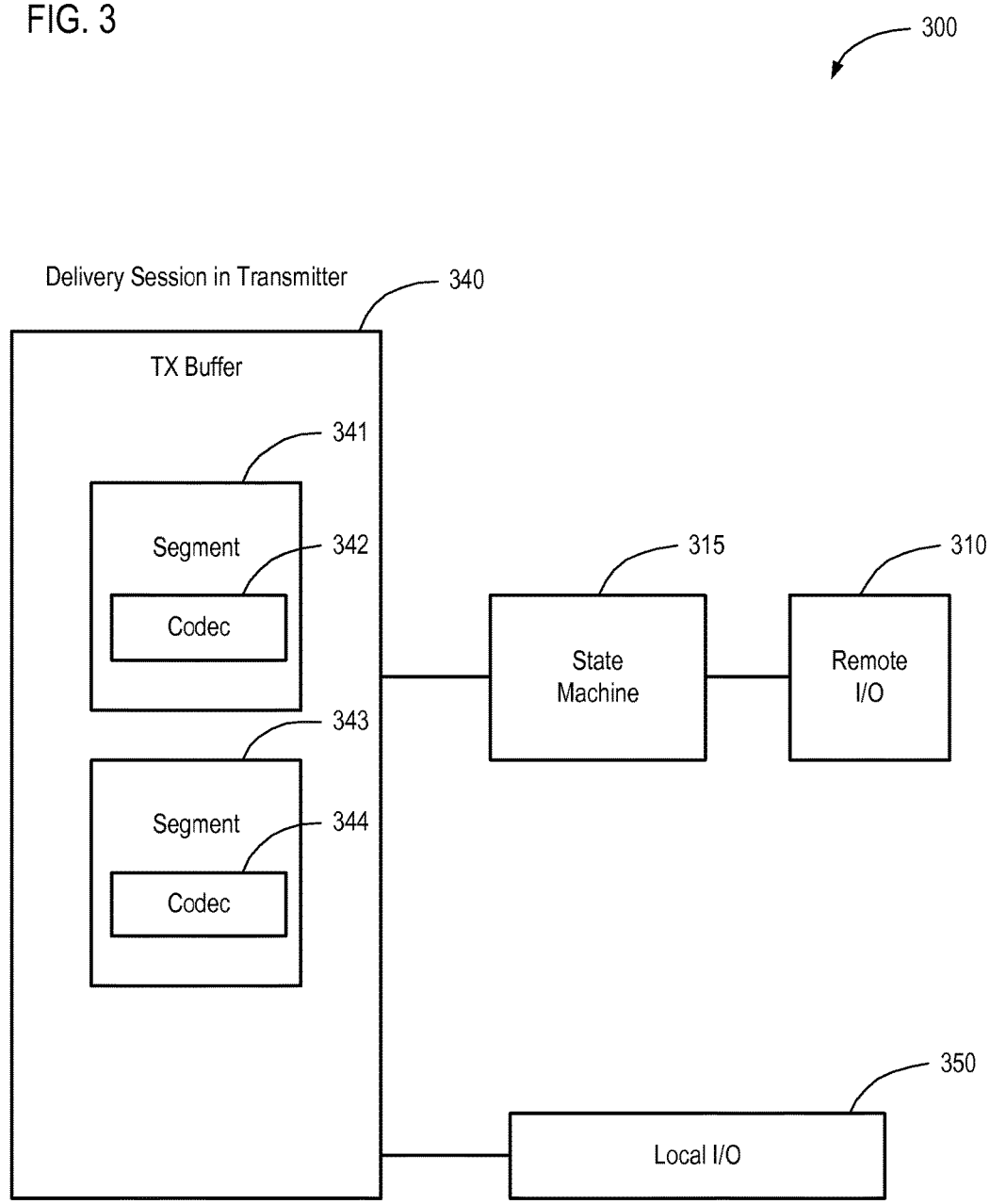
FIG. 3 is a schematic diagram of a transmitter configured to transmit a stream of encoded packets to a UE.

FIG. 3 is a schematic diagram of a transmitter 300 configured to transmit a stream of encoded packets to a UE (not shown). The transmitter 300 may include a single radio 310 to transmit the stream of encoded packets to a corresponding radio (e.g., one of the radios 210, 220, 230) of the UE. The radio 310 may be communicatively coupled to a state machine 315. The state machine 315 may keep track of how many packets have been requested by the UE, which segments the packets have been requested from, how many packets have already been sent, and/or whether a termination message has been received. If the state machine 315 determines that more packets should be deliver to the UE, the state machine 315 may request the packets from a transmit buffer 340 and may provide the packets from the transmit buffer 340 to the radio 310.

The transmit buffer 340 may be responsible buffering and encoding the segments for delivery to the UE. The transmit buffer 340 may receive the data object to be transferred via a local communication interface 350. The transmit buffer 340 may divide the data object into a plurality of segments and may store each segment or each segment currently being transmitted in its own buffer 341, 343. The transmit buffer 340 may determine a codec 342, 344 for each buffer for encoding the segment. The transmit buffer 340 may encode the segments using the codec 342, 344 for that segment. The transmit buffer 340 may determine how many encoded packets to generate based on instructions received from the state machine 315. The transmit buffer 340 may have the buffered segments 341, 343 ready for additional encoding until a semi-termination message is received.

Figure 4:
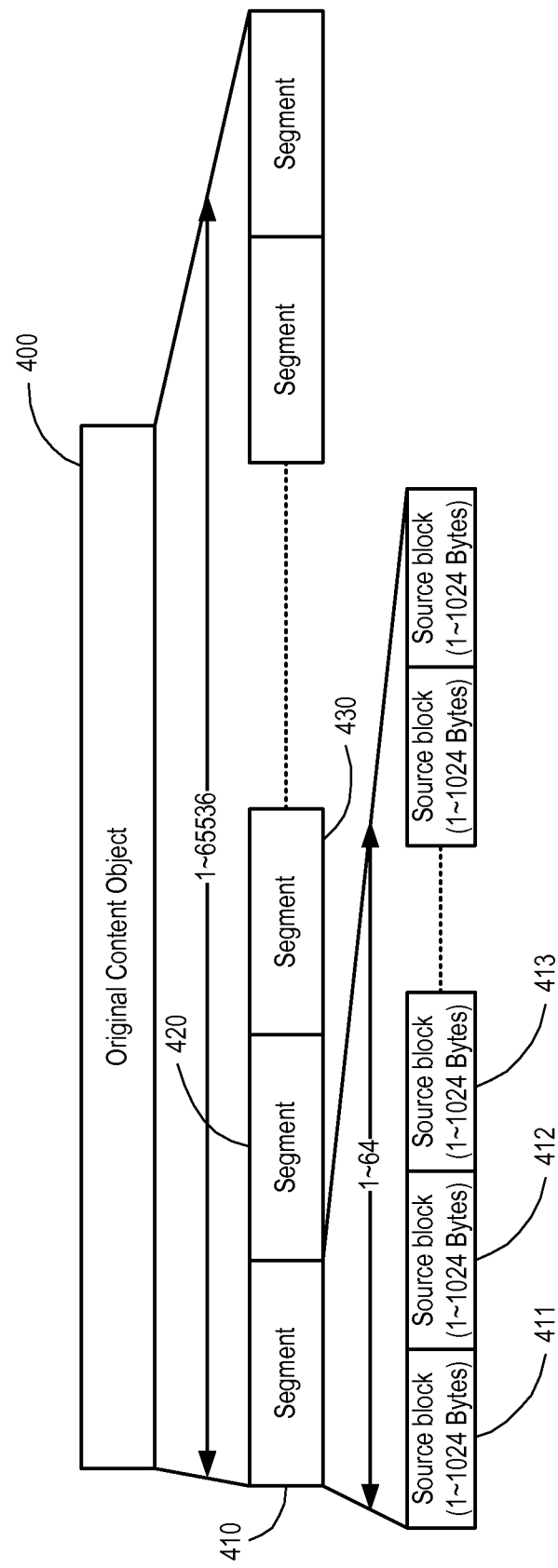
FIG. 4 is a schematic diagram of a data object divided into a plurality of segments and source blocks.

FIG. 4 is a schematic diagram of a data object 400 divided into a plurality of segments 410, 420, 430 and source blocks 411, 412, 413. Each transmitter may divide the data object 400 into a plurality of segments 410, 420, 430 with predetermined sizes. For example, each segment 410, 420, 430 may include a predetermined number of source blocks 411, 412, 413 and each source block 411, 412, 413 may be a predetermined size. In the illustrated embodiment, each source block 411, 412, 413 is 1024 bytes and each segment contains 64 source blocks. A final source block and/or a final segment may be padded with zeros. The zeros may be used during encoding and decoding but may not be otherwise transmitted to the UE. In an embodiment, the maximum number of segments may be 65,536. Each transmitter and the receiver may divide the data object into the same size segments and source blocks. Accordingly, all that is needed to determine the number of segments and the sizes of the last segment and the last source block is the size of the data object. The transmitters may know the size of the data object 400 because each transmitter may include a copy of the data object 400. One or more of the transmitters may indicate the data object size to the receiver so the receiver knows how many segments are being transmitted and the sizes of the last segment and the last source block.

Figure 5:
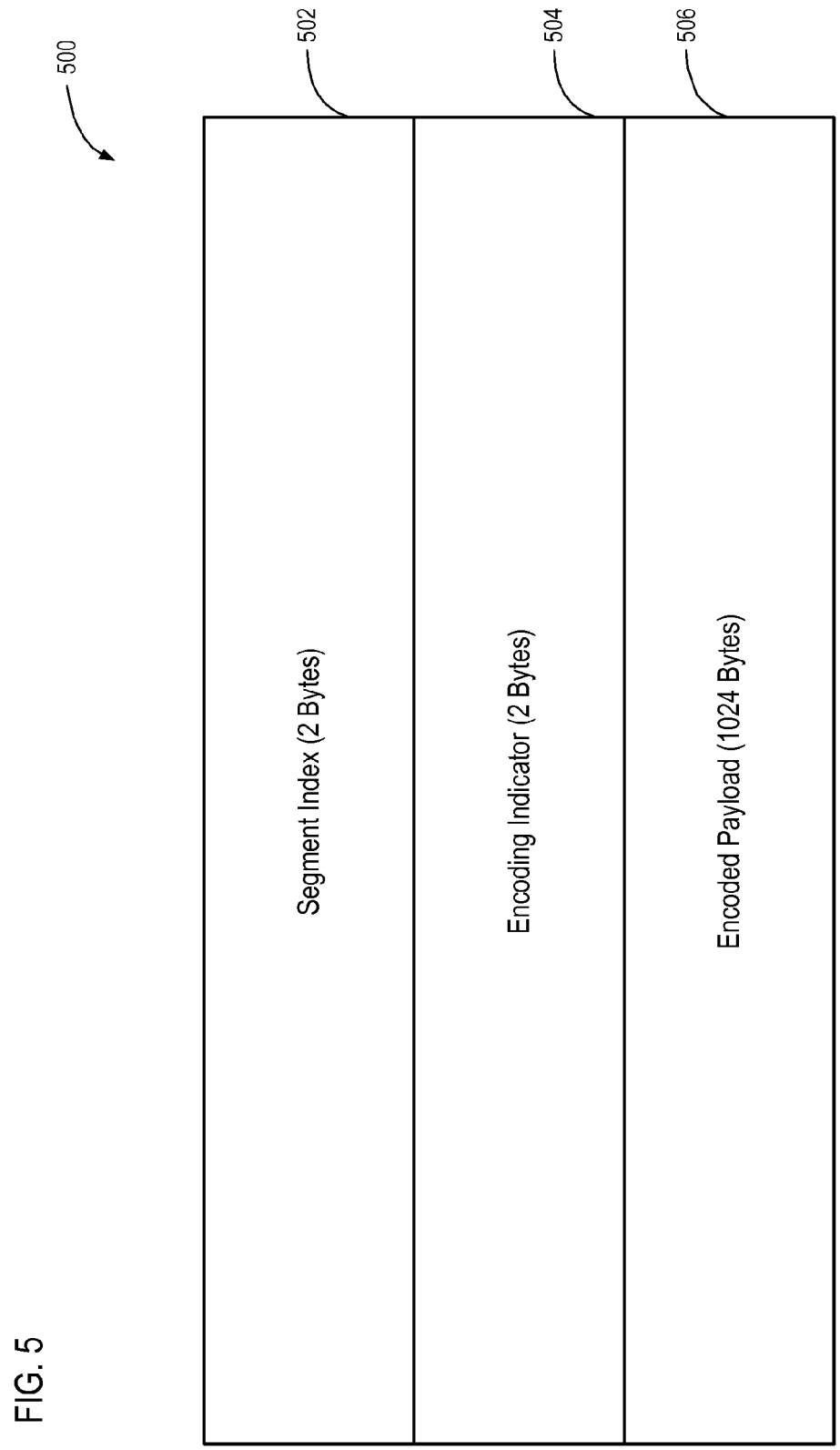
FIG. 5 is a schematic diagram of a packet containing an encoded payload for delivery to a UE.

FIG. 5 is a schematic diagram of a packet 500 containing an encoded payload 506 for delivery to a UE. The packet 500 may be configured to have very little overhead, so it may only include a segment index 502, an encoding indicator 504, and the encoded payload 506. In some embodiments, the packet 500 may include a sequence number. Alternatively, or in addition, the receiver may use a sequence number from a lower level protocol, such as the user datagram protocol (UDP), to determine which packet is being received. The segment index 502 may indicate from which segment the encoded payload 506 was derived. Each transmitter may be transmitting packets derived from more than one segment. Accordingly, the segment index 502 may allow the receiver to associate each received packet with the correct segment. In the illustrated embodiment, the segment index 502 is two bytes and thus allows there to be at most 65536 segments. In other embodiments, the segment index 502 may be more or fewer bits.

The encoding indicator 504 may allow the receiver to determine one or more encoding coefficients used to encode the payload 506 in each packet. In an embodiment, the encoding indicator 504 may be randomly selected by each transmitter for each packet being transmitted. The encoding indicator 504 may be used to determine an initial seed for a pseudorandom number generator, for example, according to equation 2. From the initial seed, a plurality of pseudorandom numbers may be generated, for example, according to equation 1. The pseudorandom numbers may be used to compute encoding coefficients, for example, according to equation 3. As long as the transmitters and the UE use the same equations, the encoding coefficients can all be derived from just the encoding indicator. Thus, the transmitters and receiver may use the same encoding coefficient for encoding and decoding but, in the illustrated embodiment, only two bytes are needed to convey all the encoding coefficients. In alternate embodiments, the encoding indicator may comprise more or fewer bits.

The encoded payload 506 may be computed from the segment based on the encoding coefficients. In the illustrated embodiment, the encoded payload is the same size as the source blocks. In other embodiments, the encoded payload and/or the entire packet 500 may include additional error correction bits and thus may be larger than the source blocks. The packet 500 may be encapsulated in packets containing additional fields by lower layer protocols. The packet 500 may otherwise not require any fields other than the ones illustrated. Accordingly, the packet 500 may include very little overhead and thus may maximize communication resources during transmission of the packet 500.

Figure 6:
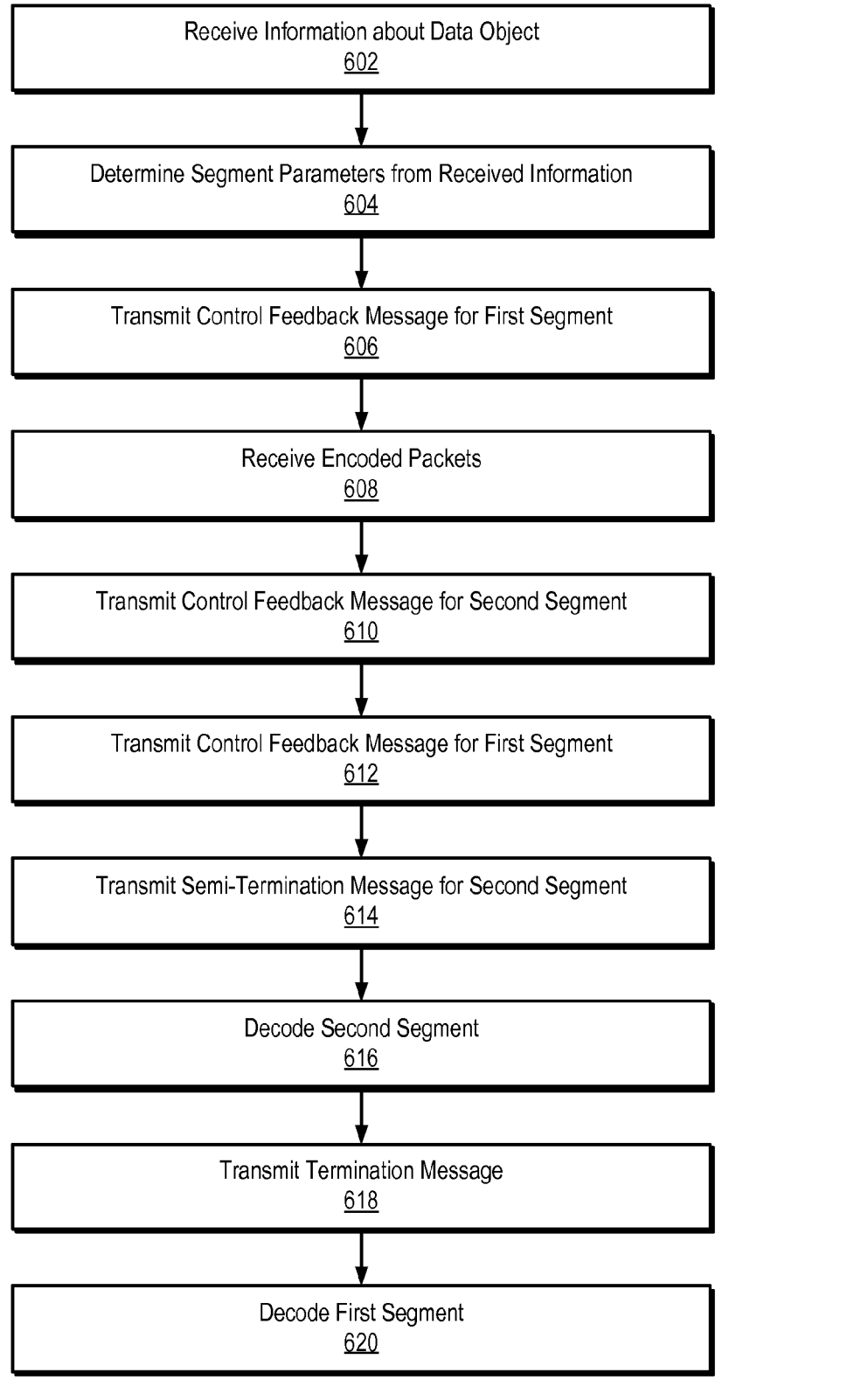
FIG. 6 is a flow diagram of a method for controlling the flow of encoded packets from one or more transmitters.

FIG. 6 is a flow diagram of a method 600 for controlling the flow of encoded packets from one or more transmitters. The method 600 may begin by receiving 602 information about a data object to be transmitted from a source. The information about the data object to be transmitted may include a size of the data object, a hash of the object, identification information for the object, identification information for one or more transmitters, and/or the like. Segment parameters may be determined 604 from the received information. For example, the number of segments may be computed as the ceiling of the size divided by 65536, the number of source blocks in the last segment may be computed as the ceiling of the size divided by 1024 minus 64 times one fewer than the number of segments, and the number of bytes in the last source block can be computed as the remainder of the size divided by 1024.

Once the segment parameters are determined 604, a transmission control message for a first segment may be transmitted 606 to a transmitter. The transmission control message may indicate, inter alia, a maximum number of packets that should be transmitted, the segment for which the packets should be transmitted, and/or the like. Additional transmission control message for the first segment may be transmitted 606 to other transmitters as well. Encoded packets derived from the first segment may be received 608 in response to the transmission control message.

If the transmitter and/or the receiver have the capacity to transmit/receive packets from additional segments, a transmission control message for a second segment may be transmitted 610 to the transmitter. Additional transmission control messages may also or instead be sent to the other transmitters as well. The transmission control message may indicate that packets derived from the second segment should be sent and may indicate a maximum number of packets that should be sent. Encoded packets from the first and second segments may continue to be received.

The transmitter may reach the maximum number of packets for the first segment and so may stop transmitting packets. However, there may not have been enough packets received to decode the first segment. Accordingly, another transmission control message for the first segment may be transmitted 612 to the transmitter. The transmission control message may again indicate a maximum number of packets to be transmitted 612. For example, the number of packets believed necessary for successful decoding may be indicated.

A sufficient number of packets to decode the second segment may be received. A semi-termination message for the second segment may be transmitted 614 to the transmitter. The semi-termination may be understood by the transmitter to indicate that no additional packets are needed for the second segment. In some embodiments, the method 600 may additionally include determining that the second segment is able to be decoded before the semi-termination message is transmitted. The second segment may then be decoded 616 from the encoded packets that have been received.

A sufficient number of packets may be received to decode the first segment. Additionally, all segments may have been received, no more segments may be needed from this transmitter, and/or the transfer may have been aborted. A termination message may be transmitted 618 to the transmitter. The termination message be understood by the transmitter to indicate that no more packets are needed for any segment. In some embodiments, the method 600 may additionally include determining that the first segment is able to be decoded and/or that no additional packets are needed before the termination message is transmitted. The first segment may be decoded 620 from the received packets, and the decoded first and second segments may be provided to operating system, persistent storage device, application, and/or the like. The decoded segments may be provided all at once and/or as they are decoded.

Figure 7:
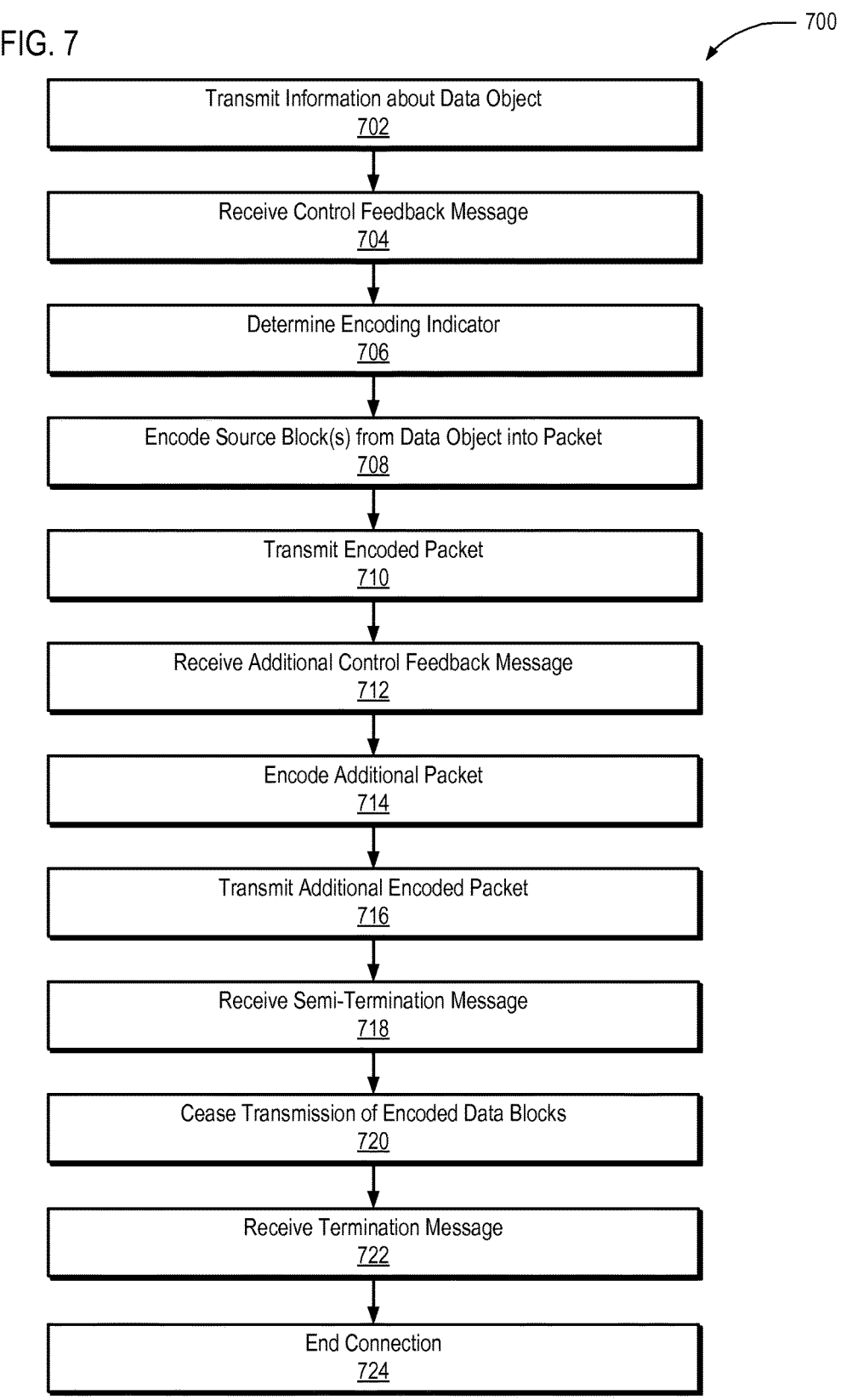
FIG. 7 is a flow diagram of a method for delivering packets to a UE based on instructions from the UE.

FIG. 7 is a flow diagram of a method 700 for delivering packets to a UE based on instructions from the UE. The method 700 may begin with transmitting 702 information about a data object to the UE. The information about the data object may be transmitted 702 to the UE in response to a request for the data object from the UE and/or in response to a request from a source server to deliver the data object to the UE. The information about the data object may include the size of the data object, a hash of the data object, identification information for the data object, and/or the like. In response, a transmission control message may be received 704 from the UE. The transmission control message may include a maximum number of packets to transmit, a segment from which the packets should be derived, and/or the like.

Based on the transmission control message, a segment may be selected and an encoding indicator for a packet derived from the segment may be determined 706. The encoding indicator may be determined 706 by randomly selecting a number between, for example, 0 and 65535, inclusive. Source blocks from the data object may be encoded 708 into packets. The source blocks may be derived from the segment specified in the transmission control message. Encoding coefficients for the source blocks may be determined from the encoding indicator. For example, the encoding indicator may be used to determine an initial seed for a pseudorandom number generator. The pseudorandom number generator may produce a plurality of pseudorandom numbers from which a corresponding plurality of encoding coefficients may be derived. A predetermined number of encoding coefficients may be used to encode each the payload for each packet. The encoded packet may be transmitted 710 to the UE. The encoded packet may include a segment index, an encoding indicator, an encoded payload, and/or the like. Additional encoding indicators may be determined 706, additional packets encoded 708, and additional packets transmitted 710 until the maximum number of packets have been transmitted and/or a semi-termination or termination message has been received.

The maximum number of packets for the segment may be transmitted, but the UE may need additional packets to decode the segment. Accordingly, an additional transmission control message may be received 712 from the UE. The additional transmission control message may specify the number of additional packets that the UE would like transmitted (e.g., the number of additional packets the UE will need transmitted in order to decode the segment). In response, an additional packet may be encoded 714 from the source blocks, which may include selecting an additional encoding indicator for the additional packet. The additional encoded packet may be transmitted 716 to the UE. Additional packets may continue to be encoded 714 and transmitted 716 to the UE until the maximum number of additional packets have been transmitted and/or a semi-termination or termination message has been received.

In the illustrated embodiment, the UE may receive enough packets to decode the segment before the maximum number of additional packets have been transmitted. Accordingly, a semi-termination message may be received 718 from the UE. The semi-termination may indicate that no more packets are needed to decode the segment. In response, transmission of encoded data blocks may be ceased 720 even if the maximum number of additional packets have not been transmitted. In some embodiments, the UE may transmit semi-termination messages even if the maximum number of additional packets have been transmitted, for example, so a transmission buffer can be cleared of unnecessary segments and/or codecs. If additional segments are being encoded and transmitted, the transmission of those segments may continue even though transmission of the packet specified in the semi-termination message has been stopped.

A termination message may eventually be received 722 from the UE. The termination message may indicate that transmission of all segments should be stopped. In response, transmission of all segments may be stopped and, in some embodiments, the connection with the UE may be ended 724. Any remaining segments and/or codecs in the transmission buffer may be removed and/or the data object be deleted. Alternatively, or in addition, the data object and/or some segments and/or codecs may be maintained for delivery to other UEs.

Figure 8:
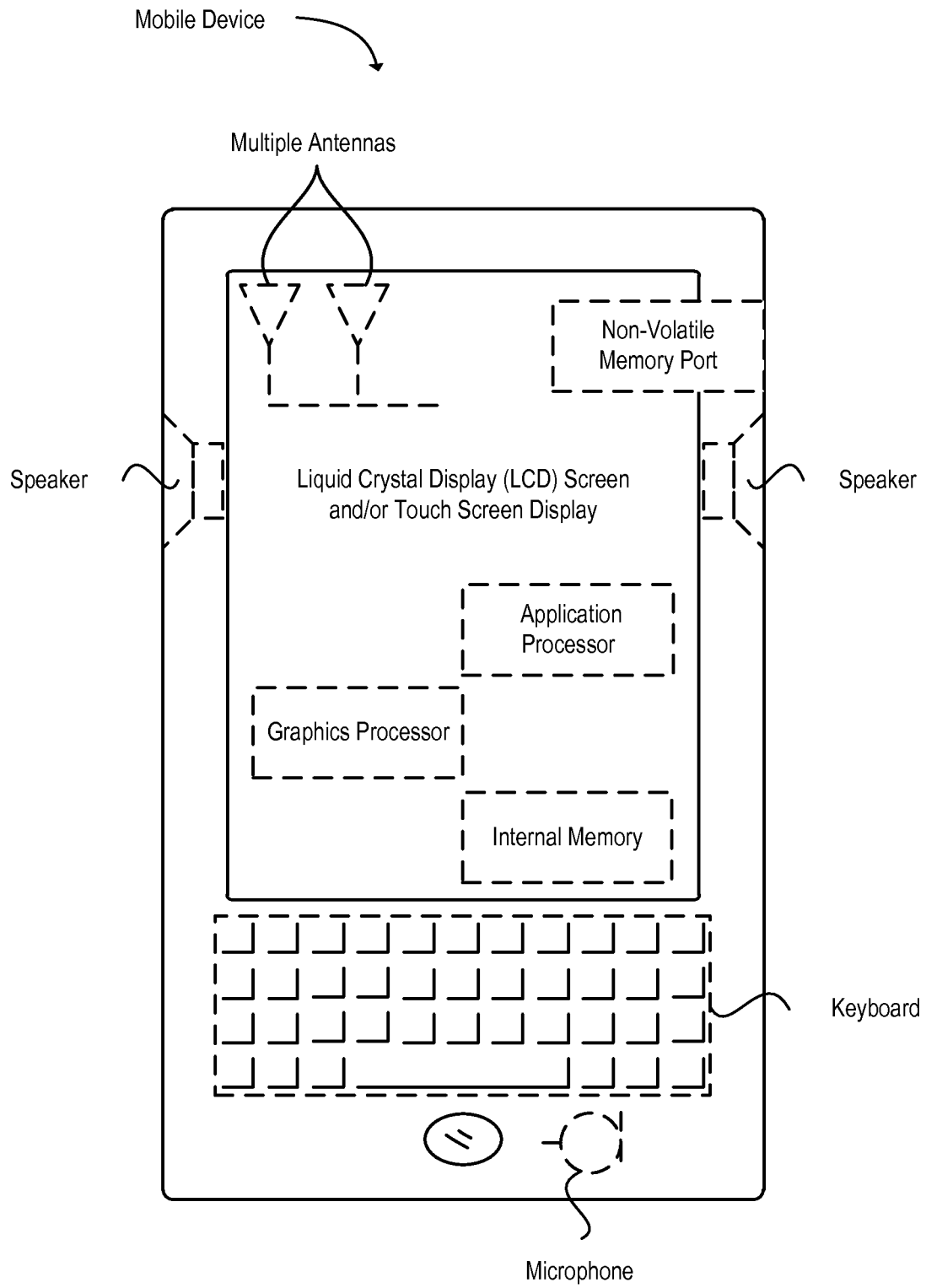
FIG. 8 is a schematic diagram of a UE able to receive streaming data via multiple radios.

FIG. 8 is an example illustration of a mobile device, such as a user equipment (UE), a mobile station (MS), a mobile wireless device, a mobile communication device, a tablet, a handset, or another type of wireless communication device. The mobile device can include one or more antennas configured to communicate with a transmission station, such as a base station (BS), an eNB, a base band unit (BBU), a remote radio head (RRH), a remote radio equipment (RRE), a relay station (RS), a radio equipment (RE), or another type of wireless wide area network (WWAN) access point. The mobile device can be configured to communicate using at least one wireless communication standard, including 3GPP LTE, WiMAX, high speed packet access (HSPA), Bluetooth, and Wi-Fi. The mobile device can communicate using separate antennas for each wireless communication standard or shared antennas for multiple wireless communication standards. The mobile device can communicate in a wireless local area network (WLAN), a wireless personal area network (WPAN), and/or a WWAN.

FIG. 8 also provides an illustration of a microphone and one or more speakers that can be used for audio input and output from the mobile device. The display screen may be a liquid crystal display (LCD) screen or other type of display screen, such as an organic light emitting diode (OLED) display. The display screen can be configured as a touch screen. The touch screen may use capacitive, resistive, or another type of touch screen technology. An application processor and a graphics processor can be coupled to internal memory to provide processing and display capabilities. A non-volatile memory port can also be used to provide data input/output options to a user. The non-volatile memory port may also be used to expand the memory capabilities of the mobile device. A keyboard may be integrated with the mobile device or wirelessly connected to the mobile device to provide additional user input. A virtual keyboard may also be provided using the touch screen.

Examples

The following examples pertain to further embodiments:

Example 1 is a UE configured to communicate with a plurality of transceivers using a plurality of distinct radio protocols. The UE includes a processor. The processor is configured to transmit a request for a first plurality of packets from a first transceiver over a first radio protocol and a request for a second plurality of packets from a second transceiver over a second radio protocol. The first and second plurality of packets are derived from a current segment of a data object. The processor is also configured to receive at least a portion of the first plurality of packets and at least a portion of the second plurality of packets. The first transceiver encodes the portion of the first plurality of packets using a linear network code, and the second transceiver encodes the portion of the second plurality of packets using the linear network code. The processor is also configured to transmit a semi-termination message to the first transceiver. The semi-termination message requests the first transceiver cease transmission of packets derived from the current segment. The processor is also configured to receive additional packets derived from another segment from the first transceiver.

In Example 2, the processor of Example 1 is configured to transmit the request for the first plurality of packets by transmitting a transmission control message indicating a maximum number of packets to transmit from the current segment. The first transceiver determines which packets to transmit.

In Example 3, the transmission control message of any of Examples 1-2 includes a sequence number indicating an order of transmission.

In Example 4, the processor of any of Examples 1-3 is configured to initially receive an indication of a size of the data object.

In Example 5, the processor of any of Examples 1-4 is configured to compute a number of segments, a size of a last segment, and a size of a last source block from the size of the data object.

In Example 6, each packet of any of Examples 1-5 includes an encoding indicator indicative of parameters of the linear network code.

In Example 7, the encoding indicator of any of Examples 1-6 is randomly selected by each transceiver for each packet being transmitted.

In Example 8, the UE of any of Examples 1-7 includes a local transceiver including transmitter and receiver components, multiple antennas, in which a first antenna of the multiple antennas is coupled to the transmitter, and in which a second antenna of the multiple antennas is coupled to the receiver, a display touchscreen, and a keyboard.

Example 9 is a method for transmitting packets from a base station to a mobile communication device that is receiving data using a plurality of distinct radio protocols. The method includes receiving a plurality of transmission control messages from the mobile communication device. The plurality of transmission control messages include a first transmission control message requesting a first quantity of packets be transmitted from a first segment of a data object and a second transmission control message requesting a second quantity of packets be transmitted from a second segment of the data object. The method also includes transmitting at least a portion of the first quantity of packets and at least a portion of the second quantity of packets. The portion of the first quantity of packets is encoded using a fountain code, and the portion of the second quantity of packets is encoded using the fountain code. The method also includes receiving a segment completion message from the mobile communication device. The segment completion message requests a stop to transmission of packets from the first segment but continuation of transmission of packets from the second segment.

In Example 10, the method of Example 9 includes receiving a termination message requesting an end to transmission of all packets.

In Example 11, the transmission of packets related to the data object in any of Examples 9-10 is controlled using solely transmission control messages, segment completion messages, and termination messages.

In Example 12, each of the plurality of transmission control messages of any of Examples 9-11 include a sequence number indicating an order of transmission.

In Example 13, each packet of any of Examples 9-12 includes a segment index indicative of a segment from which the packet was derived.

In Example 14, each packet of any of Examples 9-13 includes an encoding indicator indicative of parameters of the fountain code.

In Example 15, the method of any of Examples 9-14 includes generating a plurality of pseudorandom numbers by using the encoding indicator to determine an initial seed for a pseudorandom number generator. The method also includes computing one or more encoding coefficients for a payload of each packet based on a corresponding one or more of the plurality of pseudorandom numbers.

In Example 16, generating of the plurality of pseudorandom numbers of any of Examples 9-14 includes generating the plurality of pseudorandom numbers according to the equation $x_{k+1}=4x_k(1-x_k)$, $x_k \in (0,1)$, where $x_{k+1}$ is a next pseudorandom number and $x_k$ is a previous pseudorandom number. An initial seed is computed from the encoding indicator according to the equation $$x_0 = \begin{cases} (\alpha - M + 1)/(65536 - M), & \alpha \in [M, 65534] \\ .9999999, & \alpha = 65535 \end{cases}$$

where M is a number of blocks per segment, $x_0$ is the initial seed, and $\alpha$ is the encoding indicator.

Example 17 is a UE for receiving packets from a plurality of transceivers using a plurality of distinct radio protocols. The UE includes a first radio operating according to a first radio protocol. The first radio is configured to receive a first plurality of streams of packets from a first transceiver. The first plurality of streams are derived from a data file. The UE includes a second radio operating according to a second radio protocol. The second radio is configured to receive a second plurality of streams of packets from a second transceiver. Each stream is derived from a unique segment of the data file. Each stream is encoded using a linear network code. The second radio is also configured to transmit a stream termination message to the second transceiver. The stream termination message identifies a stream from the second plurality of streams. The second radio is also configured to receive one or more streams from the second plurality of streams without receiving the stream identified in the stream termination message after transmitting the stream termination message.

In Example 18, the second radio of Example 17 is further configured to initially transmit a plurality of transmission control messages identifying the second plurality of streams for transmission.

In Example 19, each of the plurality of transmission control messages of any of Examples 17-18 indicates a maximum number of packets to be transmitted in a corresponding stream.

In Example 20, the second radio of any of Examples 17-19 is configured to transmit a connection termination message requesting the second transceiver stop transmission of all packets.

In Example 21, the transmission of packets related to the data file from the first and second transceivers in any of Examples 17-20 is controlled using solely transmission control messages, stream termination messages, and connection termination messages.

In Example 22, each packet of any of Examples 17-21 includes a segment index indicative of a segment from which the packet was derived.

In Example 23, each packet of any of Examples 17-22 includes an encoding indicator from which one or more encoding coefficients for the packet can be derived. The encoding indicator is randomly selected.

In Example 24, the linear network code of any of Examples 17-23 is a random linear network code.

Example 25 is a method for communicating with a plurality of transceivers using a plurality of distinct radio protocols. The method includes transmitting, from a UE, a request for a first plurality of packets from a first transceiver over a first radio protocol and a request for a second plurality of packets from a second transceiver over a second radio protocol. The first and second plurality of packets are derived from a current segment of a data object. The method also includes receiving at least a portion of the first plurality of packets and at least a portion of the second plurality of packets. The first transceiver encodes the portion of the first plurality of packets using a linear network code and the second transceiver encodes the portion of the second plurality of packets using the linear network code. The method also includes transmitting a semi-termination message to the first transceiver. The semi-termination message requests the first transceiver cease transmission of packets derived from the current segment. The method also includes receiving additional packets derived from another segment from the first transceiver.

In Example 26, the transmitting of the request for the first plurality of packets of Example 25 includes transmitting a transmission control message indicating a maximum number of packets to transmit from the current segment. The first transceiver determines which packets to transmit.

In Example 27, the transmission control message of any of Examples 25-26 includes a sequence number indicating an order of transmission.

In Example 28, the transmission of packets related to the data object from the transceiver in any of Examples 25-27 is controlled using solely transmission control messages, semi-termination messages, and termination messages.

In Example 29, the method of any of Examples 25-28 includes initially receiving an indication of a size of the data object.

In Example 30, the method of any of Examples 25-29 includes computing a number of segments, a size of a last segment, and a size of a last source block from the size of the data object.

In Example 31, each packet of any of Examples 25-30 includes a segment index indicative of a segment from which the packet was derived.

In Example 32, each packet of any of Examples 25-31 includes an encoding indicator indicative of parameters of the linear network code.

In Example 33, the encoding indicator of any of Examples 25-32 is randomly selected by each transceiver for each packet being transmitted.

In Example 34, the method of any of Examples 25-33 includes generating a plurality of pseudorandom numbers. The method includes computing one or more encoding coefficients for a payload of each packet based on a corresponding one or more of the plurality of pseudorandom numbers.

In Example 35, the method of any of Examples 25-34 includes determining an initial seed for the pseudorandom number generator based on the encoding indicator.

In Example 36, the generating of the plurality of pseudorandom numbers of any of Examples 25-35 includes generating the plurality of pseudorandom numbers according to the equation $x_{k+1}=4x_k(1-x_k)$, $x_k \in (0,1)$ where $x_{k+1}$ is a next pseudorandom number and $x_k$ is a previous pseudorandom number. An initial seed is computed from the encoding indicator according to the equation $$x_0 = \begin{cases} (\alpha - M + 1)/(65536 - M), & \alpha \in [M, 65534] \\ .9999999, & \alpha = 65535 \end{cases}$$

where M is a number of blocks per segment, $x_0$ is the initial seed, and $\alpha$ is the encoding indicator.

In Example 37, the linear network code of any of Examples 25-36 is a random linear network code.

Example 38 is an apparatus including means to perform a method as described in any preceding example.

Example 39 is machine readable storage including machine-readable instructions, which when executed, implement a method or realize an apparatus as described in any preceding example.

Various techniques, or certain aspects or portions thereof, may take the form of program code (i.e., instructions) embodied in tangible media, such as floppy diskettes, CD-ROMs, hard drives, a non-transitory computer readable storage medium, or any other machine-readable storage medium, wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a RAM, an EPROM, a flash drive, an optical drive, a magnetic hard drive, or another medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Reference throughout this specification to "an example" means that a particular feature, structure, or characteristic described in connection with the example is included in at least one embodiment of the present disclosure. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples of the present disclosure may be referred to herein along with alternatives for the various components thereof. It is understood that such embodiments, examples, and alternatives are not to be construed as de facto equivalents of one another, but are to be considered as separate and autonomous representations of the present disclosure.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the disclosure is not to be limited to the details given herein, but may be modified within the scope and equivalents of the appended claims.

Those having skill in the art will appreciate that many changes may be made to the details of the above-described embodiments without departing from the underlying principles of the disclosure. The scope of the present application should, therefore, be determined only by the following claims.

The invention claimed is:

1. A User equipment (UE) configured to communicate with a plurality of transceivers using a plurality of distinct radio protocols, the UE comprising a processor configured to:
transmit a request for a first plurality of packets from a first transceiver over a first radio protocol and a request for a second plurality of packets from a second transceiver over a second radio protocol, wherein the first and second plurality of packets are derived from a current segment of a common data object;
process at least a portion of the first plurality of packets received using a first radio of the UE using the first radio protocol and at least a portion of the second plurality of packets received using a second radio of the UE using the second radio protocol, the first plurality of packets and the second plurality of packets received simultaneously and in parallel by the first radio and the second radio, wherein the first transceiver encodes the portion of the first plurality of packets using a linear network code and the second transceiver encodes the portion of the second plurality of packets using the linear network code;
transmit a semi-termination message to the first transceiver, wherein the semi-termination message requests the first transceiver cease transmission of packets derived from the current segment; and
receive additional packets derived from another segment from the first transceiver.

2. The UE of claim 1, wherein the processor is configured to transmit the request for the first plurality of packets by transmitting a transmission control message indicating a maximum number of packets to transmit from the current segment, and wherein the first transceiver determines which packets to transmit.

3. The UE of claim 2, wherein the transmission control message comprises a sequence number indicating an order of transmission.

4. The UE of claim 1, wherein the processor is configured to initially receive an indication of a size of the data object.

5. The UE of claim 4, wherein the processor is configured to compute a number of segments, a size of a last segment, and a size of a last source block from the size of the data object.

6. The UE of claim 1, wherein each packet includes an encoding indicator indicative of parameters of the linear network code.

7. The UE of claim 6, wherein the encoding indicator is randomly selected by each transceiver for each packet being transmitted.

8. The UE of claim 1, further comprising:
a local transceiver including transmitter and receiver components;
multiple antennas, in which a first antenna of the multiple antennas is coupled to the transmitter, and in which a second antenna of the multiple antennas is coupled to the receiver;
a display touchscreen; and
a keyboard.

9. A method for transmitting packets from a base station to a mobile communication device that is receiving data using a plurality of distinct radio protocols, the method comprising:
receiving a plurality of transmission control messages from the mobile communication device, wherein the plurality of transmission control messages include a first transmission control message requesting a first quantity of packets be transmitted from a first segment of a data object and a second transmission control message requesting a second quantity of packets be transmitted from a second segment of the same data object;
transmitting at least a portion of the first quantity of packets to a first radio of the mobile communication device using a first radio protocol and at least a portion of the second quantity of packets to a second radio of the mobile communication device using a second radio protocol different from the first radio protocol simultaneously with and in parallel to the transmission of the first quantity of packets to the first radio, wherein the portion of the first quantity of packets is encoded using a fountain code and the portion of the second quantity of packets is encoded using the fountain code; and
receiving a segment completion message from the mobile communication device, wherein the segment completion message requests a stop to transmission of packets from the first segment but continuation of transmission of packets from the second segment.

10. The method of claim 9, further comprising receiving a termination message requesting an end to transmission of all packets.

11. The method of claim 10, wherein the transmission of packets related to the data object is controlled using solely transmission control messages, segment completion messages, and termination messages.

12. The method of claim 9, wherein each of the plurality of transmission control messages includes a sequence number indicating an order of transmission.

13. The method of claim 9, wherein each packet includes a segment index indicative of a segment from which the packet was derived.

14. The method of claim 9, wherein each packet includes an encoding indicator indicative of parameters of the fountain code.

15. The method of claim 14, further comprising generating a plurality of pseudorandom numbers by using the encoding indicator to determine an initial seed for a pseudorandom number generator, and computing one or more encoding coefficients for a payload of each packet based on a corresponding one or more of the plurality of pseudorandom numbers.

16. The method of claim 15, wherein generating the plurality of pseudorandom numbers comprises generating the plurality of pseudorandom numbers according to the equation:

$$x_{k+1}=4x_k(1-x_k), x_k \in (0,1)$$

wherein $x_{k+1}$ is a next pseudorandom number and $x_k$ is a previous pseudorandom number, and wherein an initial seed is computed from the encoding indicator according to the equation:

$$x_0 = \begin{cases} (\alpha - M + 1)/(65536 - M), & \alpha \in [M, 65534] \\ .9999999, & \alpha = 65535 \end{cases}$$

wherein M is a number of blocks per segment, $x_0$ is the initial seed, and $\alpha$ is the encoding indicator.

17. A User equipment (UE) for receiving packets from a plurality of transceivers using a plurality of distinct radio protocols, the UE comprising:
 a first radio operating according to a first radio protocol, the first radio configured to:
  receive a first plurality of streams of packets from a first transceiver, wherein the first plurality of streams are derived from a data file;
 a second radio operating according to a second radio protocol, the second radio configured to:
  receive a second plurality of streams of packets from a second transceiver simultaneously and in parallel to receipt of the first plurality of streams, wherein each stream is derived from a unique segment of the same data file, and wherein each stream is encoded using a linear network code,
  transmit a stream termination message to the second transceiver, wherein the stream termination message identifies a stream from the second plurality of streams, and
  after transmitting the stream termination message, receive one or more streams from the second plurality of streams without receiving the stream identified in the stream termination message.

18. The UE of claim 17, wherein the second radio is further configured to initially transmit a plurality of transmission control messages identifying the second plurality of streams for transmission.

19. The UE of claim 18, wherein each of the plurality of transmission control messages indicates a maximum number of packets to be transmitted in a corresponding stream.

20. The UE of claim 17, wherein the second radio is configured to transmit a connection termination message requesting the second transceiver stop transmission of all packets.

21. The UE of claim 17, wherein the transmission of packets related to the data file from the first and second transceivers is controlled using solely transmission control messages, stream termination messages, and connection termination messages.

22. The UE of claim 17, wherein each packet includes a segment index indicative of a segment from which the packet was derived.

23. The UE of claim 17, wherein each packet includes an encoding indicator from which one or more encoding coefficients for the packet can be derived, and wherein the encoding indicator is randomly selected.

24. The UE of claim 17, wherein the linear network code is a random linear network code.

* * * * *